United States Patent [19]

Walter

[11] Patent Number: 5,032,634
[45] Date of Patent: Jul. 16, 1991

[54] STABILIZED VINYL HALIDE RESINS AND STABILIZER COMBINATION

[75] Inventor: Steven Walter, Mount Laurel, N.J.
[73] Assignee: Akzo America Inc., New York, N.Y.
[21] Appl. No.: 279,378
[22] Filed: Dec. 2, 1988
[51] Int. Cl.$^5$ .............................................. C08K 5/58
[52] U.S. Cl. ................................ 524/180; 524/181; 524/291; 524/342; 524/567; 252/400.1
[58] Field of Search ............... 524/180, 181, 342, 291, 524/567; 252/400.1

[56] References Cited

U.S. PATENT DOCUMENTS

| | | | |
|---|---|---|---|
| 3,205,189 | 9/1965 | Reed | 524/342 |
| 3,285,855 | 11/1966 | Dexter et al. | 524/291 |
| 3,310,575 | 3/1967 | Spivack | 524/567 |
| 3,313,761 | 4/1967 | Barnes et al. | 524/340 |
| 3,396,132 | 8/1968 | Perry et al. | 524/342 |
| 3,398,114 | 8/1968 | Pollock | 524/291 |
| 3,424,712 | 1/1696 | Gottlieb et al. | 524/180 |
| 3,424,717 | 1/1969 | Gottlieb et al. | 524/180 |
| 3,442,806 | 5/1969 | O'Neil | 524/180 |
| 3,483,159 | 12/1969 | Kauder | 524/178 |
| 3,530,069 | 9/1970 | O'Neil | 524/180 |
| 3,609,120 | 9/1971 | Hoye et al. | 524/682 |
| 3,759,966 | 9/1973 | Morton et al. | 524/682 |
| 4,154,892 | 5/1979 | Glatti et al. | 524/342 |
| 4,173,541 | 11/1979 | Volt | 524/342 |
| 4,274,999 | 6/1981 | Burley et al. | 524/567 |
| 4,619,957 | 10/1986 | Reid et al. | 524/291 |
| 4,751,261 | 6/1988 | Miyata et al. | 524/567 |

FOREIGN PATENT DOCUMENTS

| | | |
|---|---|---|
| 51-145559 | 12/1976 | Japan . |
| 54-138047 | 10/1979 | Japan . |
| 57-014639 | 1/1982 | Japan . |
| 60-197753 | 10/1985 | Japan . |
| 1311791 | 3/1973 | United Kingdom . |

OTHER PUBLICATIONS

Die Angewandte Makromolekulare Chemie, 114 (1983), 95–104 (1845).
Stapfer, C. H. et al.: American Chemical Society, Div. Polymer Chem. Polymer Preprints, vol. 12, No. 1, pp. 795–802, Mar. 1971.
Technical Bulletin No. 193 of Imperial Chemical Industries, Ltd.:Topanol CA, Apr. 29, 1963.
Al-Malaika et al., "Thermal Stabilization of Polyolefins", pp. 247, 264, 265, 279 and 281 of Degradation and Stabilization of Polyolefins by Norman S. Allen, 1983.

*Primary Examiner*—Veronica P. Hoke
*Attorney, Agent, or Firm*—Richard P. Fennelly; Louis A. Morris

[57] ABSTRACT

Vinyl halide resins can be stabilized by a stabilizer mixture of a monomeric tetrafunctional organotin stabilizer and a hindered tris phenol antioxidant, preferably 1,1,3-tris(2-methyl-4-hydroxy-5-tert-butylphenyl)butane.

12 Claims, No Drawings

STABILIZED VINYL HALIDE RESINS AND STABILIZER COMBINATION

BACKGROUND OF THE PRESENT INVENTION

1. Field of the Invention

The present invention relates to a stabilizer combination for use in vinyl halide resins.

2. Description of the Prior Art

While it is generally known to mix hindered phenolic-type antioxidants and organotin stabilizers in polymers, a close examination of the prior art often reveals a fairly specific teaching of which types of antioxidants, stabilizers, and polymers to use:

U.S. Pat. Nos. 3,424,712 and 3,424,717 to J. B. Gottlieb et al. teach use of a vinyl resin substrate with tin stabilizers and monophenol antioxidants, optionally with a third tin-sulfur stabilizer (as covered in the '717 patent).

U.S. Pat. No. 3,759,966 to P. D. Morton et al. teaches use of polymeric tin mercaptides with monohydric phenol, bisphenol, tris-phenol, or tetrakis-phenol stabilizers in vinyl halide resins. This reference distinguishes its polymeric tin mercaptides from conventional monomeric tin mercaptides of the formula $R_2Sn(SR')_2$ by stressing the polymeric structure of the tin mercaptide as giving these compositions the benefits of lower volatility, lower migration, and lower leaching rates.

U.S. Pat. Nos. 3,442,806 and 3,530,069 indicate that admixtures of a hindered phenolic antioxidant and a dihydrocarbyl tin sulfide of the formula $R_2Sn=S$, where R is alkyl, cycloalkyl, aralkyl and/or aryl, can be used to stabilize organic material. The tin sulfide reactant proposed is a specific class of trifunctional tin sulfide wherein only three moieties are attached to the tin atom, i.e., the two R groups and the sulfur atom which is bonded to the tin atom by a double bond. The trifunctional tin sulfides shown in this patent may be capable of forming trimers wherein the tin atoms have four ligands attached thereto. However, such species are not to be considered to be monomeric organotin compounds.

Other references which show halogen-containing resins stabilized with organotin compounds and phenolic antioxidants are: U.S. Pat. No. 3,609,120 (shows use of mono- and bisphenols as optional, but preferred additives); U.S. Pat. No. 4,274,999 (shows use of orthodihydric phenols); and Japanese Patent Publication No. 60/197,753 (shows use of ortho-divalent phenols which may also have one or more dihydric phenolic ligands substituted thereon).

SUMMARY OF THE PRESENT INVENTION

The present invention relates to stabilized vinyl halide resins which use a stabilizer mixture of a monomeric tetrafunctional organotin stabilizer and a hindered tris phenol antioxidant. Another aspect of the instant invention involves the use of a hindered tetrakis phenol antioxidant, which is a (hydroxyalkylphenyl) alkanoic acid ester of a polyol, in place of the hindered tris phenol antioxidant referred to above.

DETAILED DESCRIPTION OF THE PRESENT INVENTION

The use in the instant invention of the term "vinyl halide resin" is to be deemed inclusive of the homo- and copolymers of such monomers as vinyl chloride and vinylidene chloride. The copolymers can contain moieties derived from other ethylenically unsaturated monomers, such as the acrylates (e.g., acrylic acid, the alkyl acrylates, and acrylonitrile), other vinyl monomers (e.g., styrene, vinyl acetate, etc.), and the maleates (e.g., maleic acid, maleic anhydride, maleate esters, etc.). Vinyl halide polymer is often the most economically significant substrate polymer.

The stabilizer composition of the instant invention can be present at from about 0.1% to about 10%, preferably from about 0.25% to about 5%, by weight of the polymer substrate, and comprises: (1) at least one monomeric tetrafunctional organotin stabilizer; and (2) a hindered tris phenol antioxidant or a hindered tetrakis phenol antioxidant as described below. The weight ratio of (1) to (2) can range from about 99.5:0.5 to about 90:10. The term "tetrafunctional" in connection with the organotin stabilizer as used herein is intended to indicate that the tin atom in the monomeric organotin stabilizer contains four substituents.

It is within the contemplation of the present invention to utilize monomeric tetrafunctional organotin stabilizers of the following formulae:

or

where X can be $C_1$–$C_{12}$ alkyl (e.g., methyl, butyl, octyl, etc.) or carboalkoxyalkyl (e.g., beta-carbobutoxyethyl), and where where Y can be alkylthioglycolate (e.g., isodecylthioglycolate, isooctylthioglycolate, and 2-ethylhexylthioglycolate, etc.), alkylmercaptocarboxylate (e.g., isodecylmercaptopropionate, isooctylmercaptopropionate, and 2-ethylhexylmercaptopropionate), alkylmercaptan (e.g., n-dodecylmercaptan) or mercaptoalkylcarboxylate (beta-mercaptoethyltallate, beta-mercaptoethyloleate, beta-mercaptoethylstearate, beta-mercaptoethylisostearate, beta-mercaptoethylcaprylate, etc.).

The hindered tris phenols can be selected from known antioxidants of this type. The term "hindered tris phenol antioxidant", as used herein, is to be construed to cover hindered phenolic antioxidants containing three phenol moieties. In general, such antioxidants can be represented by the general formula

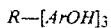

where R is an alkylidene backbone, and ArOH is a hindered phenolic group (i.e., a phenyl ring containing substituents, e.g., branched alkyl groups, such as t-butyl, which give a certain degree of steric hindrance to the ring). By use of the term "alkylidene" is meant a group derived from an alkane with three of the hydrogen atoms being replaced with the groups ArOH. However, it is especially preferred for purposes of the present invention if the selected tris phenol antioxidant is 1,1,3-tris(2-methyl-4-hydroxy-5-tert-butylphenyl)butane [CAS Registry No. 1843-03-4] which is available under the trademarks MIXXIM AO-30 from Fairmount Chemical Co. (a particularly preferred material) and TOPANOL CA from Imperial Chemical Industries.

The tetrakis phenol antioxidants referred to above are (hydroxyalkylphenyl) alkanoic acid esters of polyols having the general formula

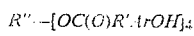

where R″ is an alkyl group minus four of its hydrogen atoms, R′ is an alkylene group, and ArOH is a hindered phenol moiety as described above. Representative antioxidants of this type are described in U.S. Pat. Nos. 3,285,855 and 3,644,482, which are each incorporated herein by reference. These antioxidants are commercially available. For example, IRGANOX 1010 antioxidant, which is tetrakis[methylene 3-(3′,5′-di-tert-butyl-4′-hydroxyphenyl)propionate]methane is especially preferred.

The antioxidant portion of this invention may be incorporated by direct addition to the halogenated vinyl polymer formulation, along with separate addition of the organotin stabilizer compound. While this method produces a positive effect, as is shown by the data in Example 5, it is not as efficient as preblending the antioxidant and organotin stabilizer. This phenomenon is typical of the extreme difficulty in achieving adequate dispersion of such small amounts of co-stabilizing ingredients.

The instant invention is further illustrated by the Examples which follow.

SYNTHESIS OF ORGANOTIN STABILIZERS

Monomeric sulfur-containing organotin stabilizers for this invention can be prepared by any of the commonly known usual synthetic routes.

EXAMPLE 1

A suitable reactor was charged with 248.7 grams (1.0 mole) of dibutyltin oxide and 425.4 grams (2.05 moles) of isooctylthioglycolate of commercial purity. The reaction mixture was heated under vacuum, with agitation, to about 110° C. while distilling off water of reaction. On cooling and filtering, 656.1 grams of dibutyltin bis(isooctylthioglycolate) was obtained as an oily liquid.

EXAMPLE 2

Monooctyltin trichloride, 338.3 grams (1.0 mole), was added to a solution of 120.0 grams (3.0 moles) sodium hydroxide in 700 ml water, in a suitable reaction vessel, at such a rate that the exothermic reaction could be controlled at or below 75° C. This was followed by addition of 622.5 grams (3.0 moles) of isooctylthioglycolate. On continued stirring at or below 75° C., the reaction was deemed complete when all solid dioctyltin oxide hd been consumed. The resulting mixture was allowed to phase split. After discharging the aqueous by-product, vacuum stripping and filtering the resulting oily liquid, 851.2 grams of monooctyl tin tris(isooctylthioglycolate) was obtained.

EXAMPLE 3

A suitable reaction vessel was charged with 14.48 grams (0.362 mole) of sodium hydroxide dissolved in 80 ml water. A solution of 28.77 grams (0.131 mole) of dimethyltin dichloride and 7.92 grams (0.033 mole) of monomethyltin trichloride was added at a rate sufficient to maintain the exothermic reaction mixture at or below 75° C. Then, 75.1 grams (0.362 mole) isooctylthioglycolate was added and reacted. After separating off the aqueous phase, the oily product phase was vacuum stripped and filtered to yield 100 grams of a 75% dimethyltin bis(isooctylthioglycolate)/25% monomethyltin tris(isooctylthioglycolate) mixture.

EXAMPLE 4

Water (55 ml) was added to a suitable reactor containing a solution of 35.3 grams (0.1 mole) of betacarbobutoxyethyltin trichloride, 116.7 grams (0.3 mole) of betamercaptoethyloleate and 55 ml of toluene. With good agitation, 17.7 grams (0.3 mole) of aqueous ammonia was added. The reaction mixture was maintained at 75° C. under agitation for about 1 hour after which the aqueous phase was separated off, and the product phase was vacuum stripped to 125° C. to remove solvent. On cooling and filtering the oily product, 141.0 grams of slightly yellow betacarbobutoxyethyltin tris(betamercaptoethyloleate) was obtained.

| TEST FORMULATIONS | Parts by Weight |
|---|---|
| I. Food Grade PVC Bottle Compound | |
| PVC Resin, RV = 1.85 | 100.00 |
| PARALOID BTA-III-N2, MBS Impact Modifier (Rohm & Haas) | 14.00 |
| PARALOID K-120ND, Acrylic Processing Aid (Rohm & Haas) | 2.00 |
| INTERSTAB G-140, Ester Lubricant (Akzo Chemicals Inc.) | 1.50 |
| AC-316A, Oxidized Polyethylene Wax (Allied Signal) | 0.20 |
| WHITTAKER 5052, Ultramarine Blue Toner (Whittaker, Clark and Daniels) | 0.05 |
| II. General Purpose Flexible PVC Compound | |
| GEON 142, PVC Resin (B. F. Goodrich) | 100 |
| Titanium Dioxide, R-101 (DuPont) | 10 |
| ATOMITE, Calcium Carbonate (R. E. Carrol) | 3 |
| Di-isodecyl Phthalate | 55 |
| III. Translucent PVC Sheet Compound | |
| PVC Resin, RV = 2.25 | 100.0 |
| PARALOID KM-323B, Acrylic Impact Modifier (Rohm & Haas) | 9.0 |
| INTERSTAB G-140, Ester Wax (Akzo Chemicals Inc.) | 0.7 |
| LOXIOL G-70, Ester Wax (Henkel) | 0.7 |
| INTERSTAB CA-18-1, Calcium Stearate (Akzo Chemicals Inc.) | 0.9 |
| OMYA UF, Calcium Carbonate (Omya, Inc.) | 3.5 |
| IV. General Purpose PVC Bottle Compound | |

-continued
TEST FORMULATIONS

| | Parts by Weight |
|---|---|
| PVC Resin, RV = 1.85 | 100.0 |
| PARALOID BTA-III-N2, MBS Impact Modifier (Rohm & Haas) | 14.0 |
| PARALOID K-120ND, Acrylic Processing Aid (Rohm & Haas) | 2.0 |
| INTERSTAB G-140, Ester Wax (Akzo Chemicals Inc.) | 1.5 |
| AC-392, Oxidized Polyethylene Wax (Allied Signal) | 0.2 |
| 2% CALCO ZIRS, Oil Violet Toner (American Cyanamid Co.) | 0.05 |
| V. Clear PVC Plastisol Compound | |
| GEON 121, PVC Dispersion Resin (B. F. Goodrich) | 100.0 |
| Di-2-ethylhexyl Phthalate | 80.0 |
| VI. PVC Potable Water Pipe Compound | |
| GEON 103, PVC Resin (B. F. Goodrich) | 100.0 |
| OMYA 90T, Calcium Carbonate (Omya, Inc.) | 3.0 |
| Titanium Dioxide, R-101 (DuPont) | 1.0 |
| INTERSTAB CA-18-1, Calcium Stearate (Akzo Chemicals Inc.) | 0.8 |
| 165° F. Melting Point Paraffin Wax | 1.1 |
| AC-629A, Oxidized Polyethylene Wax | 0.15 |
| VII. Injection Molding PVC Compound | |
| PVC Resin, RV = 1.85 | 100.0 |
| BLENDEX 338, ABS Impact Modifier (Borg-Warner) | 3.0 |
| PARALOID K-120N, Acrylic Processing Aid (Rohm & Haas) | 2.0 |
| Titanium Dioxide, R-101 (DuPont) | 1.0 |
| OMYA UFT, Calcium Carbonate (Omya, Inc.) | 3.0 |
| INTERSTAB CA-18-1, Calcium Stearate (Akzo Chemicals Inc.) | 0.7 |
| LOXIOL G-70, Ester Lubricant (Henkel) | 0.3 |
| LOXIOL G-30, Ester Lubricant (Henkel) | 0.7 |
| VIII. PVC Copolymer Calendering Compound | |
| PVC Copolymer Resin (PVC/12% PVA) | 100.0 |
| PARALOID K-120N, Acrylic Processing Aid (Rohm & Haas) | 0.8 |
| KANE ACE B-22, MBS Impact Modifier (Kanegafuchi) | 7.0 |
| HOECHST Wax OP, Montan Ester (Hoechst-Celanese) | 0.8 |
| AC-629A, Oxidized Polyethylene Wax (Allied Signal) | 0.8 |

TEST METHODS

Brabender Thermal Dynamic Stability Test

The test compound ingredients were accurately weighed and thoroughly blended together. The instrument used for this test was a C. W. Brabender Plasticorder Torque Rheometer, equipped with an electrically heated #6 roller mixing head, torque versus time recorder, and a mixing temperature versus time recorder. At a preset temperature of 190° C. and a rotor speed of 60 rpm, 60 grams of stabilized PVC compound was charged into the mixing head using a ram loading chute which was removed after the material in the mixing head had fused. The semi-molten polymer matrix was sampled periodically by stopping the motor and extracting a small amount of material using a pair of needle nose pliers. The excess was trimmed from the pliers, was returned to the mixing head, and the sample was mounted on a test card for visual comparison of color development.

Mill Dynamic Thermal Stability Test

The stabilizer compositions of this invention were accurately weighed and thoroughly blended into the test compounds. An oil-heated two roll mill, with counter-rotating rolls, was set for 370° F. (or 360° F.) roll temperature and differential roll speeds of 33/28 rpm. Each polymer composition was poured onto the rolls, set at a gap of approximately 0.040 inch, and the timer was started. The material was allowed to fuse and was banded on the front roll set at 33 rpm. Samples were taken periodically until failure (when either severe color development or sticking occurred) or a total test time of 60 minutes had been reached. The samples were mounted on a display card to show color change and material degradation.

Mill Color Hold Dynamic Thermal Stability Test

The stabilizer compositions of this invention were accurately weighed and thoroughly blended into the test compounds. An oil-heated two-roll mill, with counter-rotating rolls, was set for 370° F. (or 360° F.) roll temperature and differential roll speeds of 33/28 rpm. Each polymer composition was poured onto the rolls, set at a gap of approximately 0.040 inch, and the timer was started. The material was allowed to fuse and was banded on the front roll set at 33 rpm. Approximately 3"×3" samples were taken at 1, 3, 5, 7, and 9 minute intervals and cooled under slight pressure between two polished steel plates. After thoroughly cooling the samples, a Hunter Lab tristimulus colorimeter was used to determine the Hunter scale L, a, and b color values of each sample. The samples were then mounted on a sample card and were then compared for relative color values.

Oven Stability Test

Samples were prepared by thoroughly blending PVC resin, plasticizer, stabilizer, pigment and filler until a dry powder blend was obtained. Two clean polished steel plates and a 6"×6"×⅛" mold frame were prepared for the test. The mold frame was placed on one of the metal plates, and the frame was filled with a sufficient quantity of powder dry blend to insure complete filling of the frame. The second plate was placed on top of the frame, sandwich style, and the complete set was placed between the platens of an hydraulic press heated to approximately 350° F. The mold was compressed at 8,000 psi for 2 minutes and then cooled under pressure for 3 minutes. The resulting solid plaque was removed from the frame.

A sufficient number of samples of approximately 1"×½" were die cut from the plaques, arranged on trays and placed in a forced air oven, heated to 400° F., to allow for periodic sampling. Samples were removed at 5 minute intervals to 30 minutes, then at 10 minute intervals until failure. The samples were then attached to a test card to demonstrate color change and material degradation.

Plastisol Oven Heat Stability Test

The resin, plasticizer, and stabilizer were intensively blended until the plastisol was homogeneous. A sample of the plastisol was drawn down to a thickness of 0.020 inch on a sheet of plate glass. The glass plate with the plastisol drawn down was put into a forced air oven set at 375° F. for 5 minutes. After 5 minutes, the glass plate was removed from the oven and the fused plastisol was peeled off the glass and set on the side to cool thoroughly. A sufficient number of samples of 1"×0.5" specimens were cut from the fused sheet to allow for periodic sampling. The samples were arranged on trays in an oven set at 375°–400° F. and were removed at set intervals. The samples were then attached to a display card to show color change and material degradation.

STABILIZERS

1. Bis(betacarbobutoxyethyl)tin bis(isooctylthioglycolate)
2. 60 wt % monobutyltin tris(isooctylthioglycolate)/40 wt % dibutyltin bis(isooctylthioglycolate)
3. 97 wt % stabilizer (2)/3 wt % MIXXIM AO-30
4. 97 wt % stabilizer (1)/3 wt % MIXXIM AO-30
5. 95 wt % stabilizer (1)/5 wt % MIXXIM AO-30
6. A proprietary potable water PVC pipe stabilizer containing betacarbobutoxyethyltin tris(betamercaptoethyloleate) and 3 wt % butylated hydroxytoluene (BHT)
7. The stabilizer composition of stabilizer (6) where 3 wt % MIXXIM AO-30 replaces BHT
8. CC-7711, a commercial potable water PVC pipe stabilizer, believed to contain monobutyltin tris(-betamercaptoethyloleate), from Cardinal Chemical Co.
9. 97 wt % stabilizer (8)/3 wt % MIXXIM AO-30
10. THERMOLITE 831, a commercial stabilizer consisting of dioctyltin bis(isooctylthioglycolate), from M & T Chemicals
11. 95 wt % stabilizer (10)/5 wt % MIXXIM AO-30
12. CARSTAB TM-181, a commercial stabilizer consisting of a mixture of dimethyltin bis(isooctylthioglycolate) and monomethyltin tris(isooctylthioglycolate) in the ratio of about 3:1, from Morton-Thiokol/Ventron
13. Dibutyltin bis(isooctylthioglycolate)
14. 95 wt % stabilizer (13)/5 wt % MIXXIM AO-30
15. 85 wt % dibutyltin bis(isooctylthioglycolate)/15 wt % monobutyltin tris(isooctylthioglycolate)
16. 95 wt % stabilizer (15)/5 wt % MIXXIM AO-30
17. 95 wt % stabilizer (15)/5 wt % SANTONOX (4,4'-thiobis[2-(1,1,-dimethylethyl)-5-methyl phenol)
18. 99 wt % stabilizer (13)/1 wt % BHT
19. 97 wt % stabilizer (13)/3 wt % BHT
20. 95 wt % stabilizer (13) 5 wt % BHT
21. 99 wt % stabilizer (13)/1 wt % SANTONOX
22. 97 wt % stabilizer (13)/3 wt % SANTONOX
23. 99 wt % stabilizer (13)/1 wt % MIXXIM AO-30
24. 97 wt % stabilizer (13)/3 wt % MIXXIM AO-30
25. MARK 2051, a commercial alkyltin mercaptoester stabilizer from Witco Corp.
26. 97 wt % stabilizer (15)/3 wt % MIXXIM AO-30
27. 97 wt % stabilizer (1)/3 wt % ETHANOX 330 (4,4',4''-[2,4,6-trimethyl-1,3,5-benzenetriyl) tris(-methylene) [tris[2,6-bis(1,1-dimethylethyl)-phenol)
28. 97 wt % stabilizer (1)/3 wt % IRGANOX 1010 (Benzenepropanoic acid, 3,5-bis(1,1-dimethylethyl)-4-hydroxy-2,2-bis[[3-[3,5-bis(1,1-dimethylethyl)-4-hydroxyphenyl]-1-oxopropoxy]methyl]-1,3-propanediyl ester)
29. 97 wt % stabilizer (1)/3 wt % TOPANOL CA
30. 97 wt % stabilizer (1)/3 wt % SANTOWHITE Powder (4,4'-butylidenebis[2-(1,1-dimethylethyl) -5-methyl-phenol)
31. 97 wt % stabilizer (1)/3 wt % BHT
32. 97 wt % stabilizer (1)/3 wt % NAUGARD 445
33. A mixture of stabilizer (13), monobutyltin sulfide and dibutyltin sulfide in the ratio of 7.7:1.3:1.0 and containing a non-hydrocarbon diluent
34. Stabilizer (33), where 3 wt % of MIXXIM AO-30 replaces 3 wt % of the non-hydrocarbon diluent
35. Stabilizer (34), where the non-hydrocarbon diluent is replaced by a hydrocarbon diluent
36. 20 wt % stabilizer (13)/80 wt % stabilizer (1)
37. 97 wt % stabilizer (36)/3 wt % MIXXIM AO-30
38. 95 wt % stabilizer (12)/5 wt % MIXXIM AO-30

All organotin/antioxidant blends shown here were prepared by heating the mixture to about from 60° C. to 110° C. and holding at that temperature until all solid antioxidant had dissolved.

EXAMPLE 5

Direct, separate addition of an organotin stabilizer and various antioxidant components to Formulation I were evaluated for thermal dynamic stability in the Brabender Torque Rheometer. The results shown in Table I confirm the utility of products of this invention compared to hindered phenolic antioxidants, which are not hindered tris phenolics, and other commonly employed antioxidants.

TABLE I

| Stabi-lizer No. | PHR(a) | Color Development(b) with Time (in minutes) at 190° C. | | | | | | |
|---|---|---|---|---|---|---|---|---|
| (Formulation I) | | 2 | 4 | 6 | 8 | 12 | 16 | 20 |
| 1 | 2.0 | 1 | 2 | 2+ | 3 | 3+ | 3+ | 4+ |
| 1 + A | 2.0 + 0.1 | 1 | 2 | 2+ | 3 | 3 | 3+ | 4+ |
| 1 + B | 2.0 + 0.1 | 1− | 2− | 2 | 2+ | 3− | 3 | 4 |
| 1 + C | 2.0 + 0.1 | 1 | 2 | 2+ | 3 | 3 | 3+ | 4+ |
| 1 + A + D | 2.0 + 0.1 + 0.1 | 1 | 2 | 2+ | 3 | 3+ | 3+ | 4+ |
| 1 + B + D | 2.0 + 0.1 + 0.1 | 1 | 2 | 2+ | 3 | 3 | 3 | 5− |
| 1 + C + D | 2.0 + 0.1 + 0.1 | 1 | 2 | 2+ | 3 | 3+ | 3+ | 5 |
| 1 + E | 2.0 + 0.1 | 1− | 2− | 2 | 3− | 3− | 3 | 4+ |
| 1 + E + D | 2.0 + 0.1 + 0.1 | 1 | 2 | 2+ | 3− | 3 | 3+ | 5 |

(a)PHR: Parts of stabilizer per 100 parts of resin.
(b)Color Scale: 1 = clear blue, 2 = clear pale blue-green, 3 = yellow-green, 4 = light amber, 5 = dark brown.
A = BHT.
B = TOPANOL CA.
C = ULTRANOX 276.
D = Dilaurylthiodipropionate.
E = MIXXIM AO-30.

The "−" indicates a slightly lower color tone than indicated for the number itself whereas a "+" is indicative of a slightly higher color tone.

EXAMPLE 6

The stabilizers and antioxidant compositions of this invention are also effective in flexible PVC applications, even when added individually to a test formulation. Table II shows the improvement in early color control that MIXXIM AO-30 affords to an organotin stabilizer, compared to certain other antioxidants, on static oven testing.

TABLE II

| Stabi-lizer No. | PHR | Color Development(c) with Time (in minutes) at 375° F. | | | | | | | |
|---|---|---|---|---|---|---|---|---|---|
| (Formulation II) | | Initial | 10 | 20 | 30 | 40 | 50 | 60 | 70 |
| 15 + A | 2.0 + 0.05 | 1 | 1 | 2 | 2+ | 3 | 3+ | 4 | 5 |
| 15 + F | 2.0 + 0.005 | 1 | 1 | 1+ | 2+ | 3 | 3+ | 4 | 5 |
| 15 + E | 2.0 + 0.05 | 1 | 1 | 1+ | 1+ | 2+ | 3 | 4 | 5− |

(c)Color scale: 1 = white, 2 = cream, 3 = light beige, 4 = dark beige, 5 = brown.
A = BHT.
F = SANTONOX.
E = MIXXIM AO-30.

EXAMPLE 7

Improvement in color control of translucent PVC compounds by stabilizer/antioxidant systems of this invention is demonstrated by the results (Table III) of mill dynamic thermal stability testing in comparison to neat organotins and antioxidant/organotin stabilizer combinations which are not part of the present invention.

TABLE III

| Stabi-lizer No. | PHR | Color Development(d) with Time (in minutes) at 370° F. | | | | | | |
|---|---|---|---|---|---|---|---|---|
| (Formulation III) | | 1 | 10 | 20 | 30 | 40 | 50 | 60 |
| 13 | 3.9 | 1 | 1+ | 2 | 3 | 4 | 4 | 5 |
| 14 | 3.9 | 1 | 1 | 1+ | 2 | 2+ | 3 | 4 |
| 15 | 3.9 | 1 | 1+ | 2 | 3 | 4 | 4 | 5 |
| 16 | 3.9 | 1 | 1 | 1+ | 2 | 3 | 3+ | 5 |
| 17 | 3.9 | 1 | 1 | 2 | 3 | 4 | 4 | 5 |

(d)Color scale: 1 = white, 2 = light yellow, 3 = dark yellow, 4 = light orange, 5 = dark orange.

EXAMPLE 8

In a comparison of state-of-the-art mixtures of other organotin stabilizers and antioxidants, like BHT and SANTONOX, with MIXXIM AO-30, a preferred product of this invention, it is seen that the other mixtures show very little to no effect or even deleterious effects, while the preferred antioxidant is shown to significantly improve performance. Results are listed in Table IV for mill dynamic thermal stability evaluations.

TABLE IV

| Stabi-lizer No. | PHR | Color Development(d) with Time (in minutes) at 370° F. | | | | | | |
|---|---|---|---|---|---|---|---|---|
| (Formulation III) | | 1 | 10 | 20 | 30 | 40 | 50 | 60 |
| 13 | 3.9 | 1 | 2− | 2 | 3 | 4− | 4+ | 5− |
| 23 | 3.9 | 1 | 1+ | 1+ | 2 | 3 | 3+ | 4 |
| 24 | 3.9 | 1 | 1+ | 1+ | 2− | 3− | 3 | 4− |
| 14 | 3.9 | 1 | 1+ | 1+ | 2 | 3 | 3+ | 4 |
| 18 | 3.9 | 1 | 1+ | 2+ | 3− | 3+ | 4 | 5 |
| 19 | 3.9 | 1 | 1+ | 2 | 3− | 3+ | 4 | 5 |
| 20 | 3.9 | 1 | 1+ | 2 | 3− | 3+ | 4− | 5− |
| 21 | 3.9 | 1 | 1+ | 2 | 3− | 3 | 4 | 4+ |
| 22 | 3.9 | 1 | 1+ | 2 | 3− | 3 | 4 | stuck |
| 17 | 3.9 | 1 | 1+ | 2 | 3− | 3 | 4 | stuck |

(d)Refer to Table III.

EXAMPLE 9

The effectiveness of stabilizer/antioxidant systems of this invention is exemplified by instrumental colorimetric readings. In Table V, the results of evaluating an organotin stabilizer with and without a preferred antioxidant (MIXXIM AO-30) are shown for mill color hold dynamic thermal stability evaluations. It should be noted that the Hunter scale b-value represents a yellowness/blueness color dimension, whereby the more positive the b-value the greater the yellowness and the lower the blueness; the more negative the b-value, the greater the blueness and the lower the yellowness. Yellowness is undesirable in these tests so the lower the b-value, the more desirable the test outcome is. Putting it another way, the lower the b-value, the more efficient the stabilizer is.

TABLE V

| Stabilizer No. (Formulation III) | PHR | Color Development[e] with Time (in minutes) at 370° F. | | | | |
|---|---|---|---|---|---|---|
| | | 1 | 3 | 5 | 7 | 9 |
| 13 | 3.9 | 6.22 | 8.75 | 9.56 | 11.19 | 12.39 |
| 24 | 3.9 | 6.28 | 7.52 | 9.01 | 9.91 | 11.20 |

[e]Hunter b-value.

EXAMPLE 10

Mill dynamic thermal stability evaluation results on PVC bottle compounds for FDA-sanctioned food contact applications, using the preferred embodiments of this invention, were outstanding. Both improved color maintenance and extended dynamic processing properties have been found, as can be seen from the data in Table VI, for an octyltin stabilizer.

TABLE VI

| Stabilizer No. (Formulation I) | PHR | Color Development[b] with Time (in minutes) at 360° F. | | | | | | | | |
|---|---|---|---|---|---|---|---|---|---|---|
| | | 3 | 12 | 20 | 30 | 40 | 45 | 50 | 60 | 70 |
| 10 | 2.0 | 1 | 1 | 2 | 3− | 3+ | 4 | stuck | — | — |
| 11 | 2.0 | 1 | 1 | 1+ | 1+ | 2+ | 3 | 3+ | 4 | 5− |

[b]Refer to Table I.

EXAMPLE 11

While not as dramatic as Example 10, similar results have been found with methyltin stabilizers; their use with a preferred antioxidant (MIXXIM AO-30) shows improvement over the neat organotin product, as determined by mill dynamic thermal stability evaluations. The data appear in Table VII.

TABLE VII

| Stabilizer No. (Formulation I) | PHR | Color Development[b] with Time (in minutes) at 360° F. | | | | | | | |
|---|---|---|---|---|---|---|---|---|---|
| | | 3 | 9 | 15 | 25 | 30 | 35 | 40 | 45 |
| 12 | 2.0 | 1 | 1 | 1+ | 2 | 3− | 3+ | 4 | stuck |
| 38 | 2.0 | 1 | 1 | 1+ | 2 | 2+ | 3− | 3+ | 4 |

[b]Refer to Table I.

EXAMPLE 12

Analogous results to Example 11 were observed for an estertin stabilizer, when preblended with a preferred antioxidant (MIXXIM AO-30). Dynamic mill stability data are presented in Table VIII.

In another evaluation, Brabender dynamic thermal stability was shown to improve with the use of the organotin stabilizer/antioxidant system, compared to the neat organotin compound. These data are shown in Table VIIIA.

TABLE VIII

| Stabilizer No. (Formulation I) | PHR | Color Development[b] with Time (in minutes) at 360° F. | | | | | |
|---|---|---|---|---|---|---|---|
| | | 3 | 9 | 15 | 20 | 30 | 40 |
| 1 | 2.0 | 1 | 1+ | 2 | 3 | 5 | 5 |
| 4 | 2.0 | 1 | 1 | 1+ | 2− | 4 | 5− |
| 5 | 2.0 | 1 | 1 | 1+ | 1+ | 4− | 5− |

[b]Refer to Table I.

TABLE VIIIA

| Stabilizer No. (Formulation I) | PHR | Cross-Link Stability Time (in minutes) at 360° F. |
|---|---|---|
| 1 | 2.0 | 18.0 |
| 4 | 2.0 | 19.0 |
| 5 | 2.0 | 20.0 |

EXAMPLE 13

Additional comparisons of the present invention to state-of-the-art antioxidant use are found in Table IX and represent mill dynamic stability testing. While TOPANOL CA is described as a chemical equivalent to MIXXIM AO-30, its performance was found not to be as good. Lower purity is believed to be the reason for this phenomenon, as the reported melting point of TOPANOL CA is 182°–188° C. vs. 193°–195° C. for MIXXIM AO-30.

TABLE IX

| Stabilizer No. (Formulation I) | PHR | Color Development[b] with Time (in minutes) at 360° F. | | | | | |
|---|---|---|---|---|---|---|---|
| | | 3 | 9 | 15 | 20 | 30 | 40 |
| 1 | 2.0 | 1 | 1 | 1+ | 3− | 4 | stuck |
| 4 | 2.0 | 1 | 1 | 1+ | 2− | 3 | 5 |
| 27 | 2.0 | 1 | 1 | 1+ | 2 | stuck | — |
| 28 | 2.0 | 1 | 1 | 1+ | 2 | 3+ | 5 |
| 39 | 2.0 | 1 | 1+ | 2− | 2+ | stuck | — |
| 30 | 2.0 | 1 | 1+ | 2− | 3− | 4 | stuck |
| 31 | 2.0 | 1 | 1 | 1+ | 2+ | 4 | stuck |
| 32 | 2.0 | 1 | stuck | | | | |

[b]Refer to Table I.

EXAMPLE 14

Stabilization of PVC bottle compound is significantly improved when this invention is practiced. Compared to the use of neat organotin stabilizers, solutions of the organotin and preferred stabilized (MIXXIM AO-30) show less color development during mill dynamic thermal stability testing. Table X lists these results.

TABLE X

| Stabilizer No. (Formulation IV) | PHR | Color Development[b] with Time (in minutes) at 370° F. | | | | | |
|---|---|---|---|---|---|---|---|
| | | 3 | 9 | 15 | 20 | 30 | 40 | 50 |
| 2 | | 1 | 1+ | 3 | 4 | 5 | 5+ | stuck |
| 3 | | 1 | 1 | 2 | 3 | 5 | 5+ | stuck |
| 15 | | 1 | 1 | 1+ | 2+ | 4 | 5 | 5+ |
| 26 | | 1 | 1 | 1+ | 2 | 3 | 4 | 5 |
| 13 | | 1 | 1+ | 1+ | 2 | 3 | 4 | 5+ |
| 24 | | 1 | 1 | 1 | 1+ | 2 | 3 | 4 |

[b]Refer to Table I.

EXAMPLE 15

The stabilization of potable water PVC pipe requires much lower stabilizer usage levels than most other applications. Typical commercial production of PVC pipe calls for use of about 0.25 to 0.5 parts of stabilizer per 100 parts of resin (phr). Even at these low concentrations of organotin stabilizer/antioxidant blends, the instant invention allows for improvement in Brabender thermal dynamic color stability compared to the use of neat organotin stabilizers. Table XI shows these results.

TABLE XI

| Stabi-lizer No. (Formulation IV) | PHR | Color Development(c) with Time (in minutes) at 200° C. | | | | | | | |
|---|---|---|---|---|---|---|---|---|---|
| | | 1 | 2 | 3 | 4 | 5 | 6 | 8 | 10 | 12 |
| 6 | 0.4 | 1 | 1 | 1 | 1+ | 2 | 3 | 4 | 5 | 5+ |
| 7 | 0.4 | 1 | 1 | 1 | 1 | 1+ | 3— | 4 | 5 | 5+ |
| 8 | 0.4 | 1 | 1 | 1 | 1 | 1+ | 2— | 3+ | 4+ | 5 |
| 9 | 0.4 | 1 | 1 | 1 | 1 | 1 | 1+ | 3 | 4 | 5 |

(c)Refer to Table II.

EXAMPLE 16

Plastisol oven heat stability testing of an organotin stabilizer containing a dissolved hindered tris phenol antioxidant showed performance advantages over the neat organotin product; even in a highly plasticized vinyl compound, the products of this invention show their effectiveness. Results are included in Table XII.

TABLE XII

| Stabi-lizer No. (Formulation V) | PHR | Color Development(e) with Time (in minutes) at 425° F. | | | | |
|---|---|---|---|---|---|---|
| | | Initial | 10 | 20 | 30 | 40 |
| 2 | 2.5 | 1 | 1+ | 3 | 4 | 5 |
| 3 | 2.5 | 1 | 1+ | 2 | 3 | 5— |

(e)Color Scale: 1 = clear, water-white, 2 = pale yellow, 3 = yellow, 4 = light amber, 5 = dark brown.

EXAMPLE 17

Color control of PVC compounds processed by injection molding is very difficult, due to the high shear developed. The compositions of this invention offer improved stabilization efficacy over neat organotin compounds, even complex mixtures. Table XII shows the results from Brabender thermal dynamic stability. Table XIIA indicates the mill dynamic stability times to sticking (failure).

TABLE XIII

| Stabi-lizer No. (Formulation VII) | PHR | Color Development(c) with Time (in minutes) at 190° C. | | | | | |
|---|---|---|---|---|---|---|---|
| | | 2 | 4 | 6 | 8 | 16 | 25 |
| 33 | 1.75 | 1+ | 2 | 2 | 3 | 4 | 5 |
| 34 | 1.75 | 1 | 1+ | 2— | 3 | 4 | 5 |
| 35 | 1.75 | 1 | 1+ | 1+ | 2+ | 3 | 4 |

(c)Refer to Table II.

TABLE XIIIA

| Stabi-lizer No. (Formulation VII) | PHR | Time (in minutes) at 360° F. To Failure (Sticking) |
|---|---|---|
| 33 | 1.75 | 43.0 |
| 34 | 1.75 | 59.5 |
| 35 | 1.75 | 58.0 |

EXAMPLE 18

Organotin stabilizer/antioxidants of this invention are also found to be effective in minimizing discoloration of PVC copolymer formulations. Table XIV shows data for a mill dynamic thermal stability test performed in a poly(vinylchloride)/poly(vinylacetate) resin.

TABLE XIV

| Stabi-lizer No. (Formulation VIII) | PHR | Color Development(e) with Time (in minutes) at 350° F. | | | | | |
|---|---|---|---|---|---|---|---|
| | | 3 | 9 | 15 | 24 | 45 | 60 |
| 15 | 4.0 | 1 | 2— | 2 | 3 | 3 | 5+ |
| 26 | 4.0 | 1 | 1+ | 1+ | 2 | 3 | 5— |
| 36 | 4.0 | 1 | 1+ | 1+ | 3 | 3+ | 5+ |
| 37 | 4.0 | 1 | 1+ | 1+ | 2+ | 3 | 5 |

(e)Refer to Table XII.

The above Examples illustrate that the stabilizer mixtures of the instant invention, like other stabilizers and stabilizer mixtures tested herein, have utility as stabilizers in vinyl halide polymer compositions and that, in many cases, the additional presence of the tris phenol antioxidant yields a stabilizer mixture having superior properties as compared to the organotin stabilizer used alone. The stabilizer mixtures containing tris phenols which fall within the scope of the instant invention are Nos. 3–5, 7, 9, 11, 14, 16, 23–24, 26, 29, 34–35 and 37–38. In particular, the above described superior effect is shown in the following Tables: III (compare 14 with 13 and 16 with 15); IV (compare 23, 24 and 14 with 13); V (compare 24 with 13 at times of 3–9 minutes); VI (compare 11 with 10); VII (compare 38 with 12 at times of 30–45 minutes); VIII (compare 4 and 5 with 1 at times of 9–40 minutes); VIIIA (compare 4 and 5 with 1); IX (compare 4 with 1 at times of 20–40 minutes); X (compare 24 with 13 at times of 9–50 minutes); XIII (compare 35 with 33 at times of 2–25 minutes); and XIIIA (compare 34 and 35 with 33).

In regard to the second embodiment of the invention which uses the tetrakis phenol antioxidant described herein, the results shown for stabilizer No. 28 in Table IX should be consulted and compared to those for No. 1 which only consisted of the organotin stabilizer.

Some features of the products of this invention are that they provide excellent resistance to early discoloration (yellowing) and unexpected extension of long term static and dynamic thermal stability to both rigid and flexible PVC formulations. This holds true in comparison to both the neat organotin stabilizers and state-of-the-art mixtures of organotins and hindered mono- and di-phenolic antioxidants.

Organotin stabilizers described in the present invention are often employed in combination with other types of organotin compounds. The use of the organotin/antioxidant compositions of this invention in combination with other types of organotin compounds is deemed to be within the scope of this disclosure.

Examples of other types of organotins include those compounds derived from monofunctional sulfur ligands, mono- di- or poly non-sulfur ligands, such as halides, pseudohalides and carboxylate ligands, i.e., carboxylic acid salts.

Specific examples include but are not limited to organotins containing: n-dodecyl mercaptide, chloride, laurate, stearate, isostearate, maleate, maleate half-esters and sulfide.

The foregoing Examples illustrate certain embodiments of the instant invention but should not be construed in a limiting manner. The scope of protection that is sought is set forth in the claims which follow.

I claim:

1. A stabilizer mixture for vinyl halide polymers which comprises: (1) a monomeric tetrafunctional sulfur-containing organotin stabilizer; and (2) a hindered tris phenol antioxidant having an alkylidene backbone.

2. A mixture as claimed in claim 1 wherein the stabilizer (1) is of the formula $XSn(Y)_3$ or $X_2SnY_2$ where X is selected from the group consisting of $C_1-C_{12}$ alkyl and carboalkoxyalkyl and Y is selected from the group consisting of alkylthioglycolate, alkylmercaptocarboxylate, alkylmercaptan and mercaptoalkylcarboxylate.

3. A mixture as claimed in claim 1 wherein the antioxidant (2) has the formula $R-[ArOH]_3$ where R is an alkylidene backbone and ArOH is a hindered phenolic group.

4. A mixture as claimed in claim 2 wherein the antioxidant (2) has the formula $R-[ArOH]_3$ where R is an alkylidene backbone and ArOH is a hindered phenolic group.

5. A mixture as claimed in any of claims 1-4 where the antioxidant (2) is 1,1,3-tris(2-methyl-4-hydroxy-5-tert-butylphenyl)butane.

6. A stabilized vinyl halide polymer containing the stabilizer mixture of any one of claims 1-4.

7. A stabilizer mixture for vinyl halide polymers which comprises: (1) a monomeric tetrafunctional sulfur-containing organotin stabilizer; and (2), as a tetrakis phenol antioxidant, a (hydroxyalkylphenyl) alkanoic acid ester of a polyol.

8. A mixture as claimed in claim 7 wherein the stabilizer (1) is of the formula $XSn(Y)_3$ or $X_2SnY_2$ where X is selected from the group consisting of $C_1-C_{12}$ alkyl and carboalkoxyalkyl and Y is selected from the group consisting of alkylthioglycolate, alkylmercaptocarboxylate, alkylmercaptan and mercaptoalkylcarboxylate.

9. A mixture as claimed in claim 7 wherein the antioxidant (2) has the formula $R''-[OC(O)R'ArOH]_4$ where R is alkyl, R' is alkylene and Ar is a hindered phenolic group.

10. A mixture as claimed in claim 8 wherein the antioxidant (2) has the formula $R''-[OC(O)R'ArOH]_4$ where R is alkyl, R' is alkylene and Ar is a hindered phenolic group.

11. A mixture as claimed in any one of claims 7-10 where the antioxidant (2) is tetrakis[methylene 3-(3',5'-di-tert-butyl-4'-hydroxyphenyl)propionate]methane.

12. A stabilized vinyl halide polymer containing the stabilizer mixture of any one of claims 7-10.

* * * * *